(12) United States Patent
Langley et al.

(10) Patent No.: US 12,098,251 B2
(45) Date of Patent: Sep. 24, 2024

(54) ESTERS OF POLYLACTIC ACID AND COMPOSITIONS THEREOF

(71) Applicants: Fashion Chemicals GmbH & Co. KG, Geretsried (DE); Jeffrey T. Langley, Gastonia, NC (US); Kay M. McCoy, Fort Mill, SC (US); Paul C. Meredith, Huntersville, NC (US)

(72) Inventors: Jeffrey T. Langley, Gastonia, NC (US); Kay M. McCoy, Fort Mill, SC (US); Paul C. Meredith, Huntersville, NC (US)

(73) Assignee: FASHION CHEMICALS GMBH & CO. KG, Geretsried (DE)

(*) Notice: Subject to any disclaimer, the term of this patent is extended or adjusted under 35 U.S.C. 154(b) by 47 days.

(21) Appl. No.: 17/942,770

(22) Filed: Sep. 12, 2022

(65) Prior Publication Data
US 2023/0099671 A1    Mar. 30, 2023

Related U.S. Application Data

(63) Continuation of application No. 16/753,405, filed as application No. PCT/US2018/054327 on Oct. 4, 2018, now abandoned.

(60) Provisional application No. 62/568,246, filed on Oct. 4, 2017.

(51) Int. Cl.
| | |
|---|---|
| C08L 67/04 | (2006.01) |
| C08G 63/664 | (2006.01) |
| C08G 65/332 | (2006.01) |
| C08G 81/00 | (2006.01) |
| D06M 15/507 | (2006.01) |
| D06M 15/53 | (2006.01) |
| D06M 101/06 | (2006.01) |
| D06M 101/32 | (2006.01) |
| D06M 101/34 | (2006.01) |

(52) U.S. Cl.
CPC .......... *C08G 81/00* (2013.01); *C08G 63/664* (2013.01); *C08G 65/332* (2013.01); *C08L 67/04* (2013.01); *D06M 15/507* (2013.01); *D06M 15/53* (2013.01); *D06M 2101/06* (2013.01); *D06M 2101/32* (2013.01); *D06M 2101/34* (2013.01); *D06M 2200/01* (2013.01)

(58) Field of Classification Search
CPC .......... C08G 63/08; D04H 3/011; C08L 67/04
See application file for complete search history.

(56) References Cited

U.S. PATENT DOCUMENTS

| | | |
|---|---|---|
| 2,917,410 A | 12/1959 | Vitalis |
| 6,117,949 A | 9/2000 | Rathi et al. |
| 6,602,963 B2 | 8/2003 | Siol et al. |
| 10,300,019 B2 | 5/2019 | Steendam et al. |
| 2010/0074934 A1 | 3/2010 | Hunter |
| 2011/0052633 A1 | 3/2011 | Huang et al. |
| 2012/0172454 A1 | 7/2012 | Gaudriault |
| 2017/0281561 A1* | 10/2017 | Go .................. A61K 9/703 |

FOREIGN PATENT DOCUMENTS

JP    09157368 A    6/1997

OTHER PUBLICATIONS

International Search Report for PCT/US2018/054327 dated Feb. 11, 2019, 5 pages.
English Translation of Chinese First Office Action for 201880065275.X dated Mar. 17, 2022, 10 pages.
Bibliographic data and Machine Translation for JP09157368A dated Jun. 17, 1997, 11 pages.

* cited by examiner

*Primary Examiner* — Gregory Listvoyb
(74) *Attorney, Agent, or Firm* — Sand, Sebolt & Wernow Co., LPA

(57) ABSTRACT

Esters of polylactic acid, including polyethylene glycol esters of polylactic acid are disclosed. Exemplary esters of polylactic acid can be used as textile finishes. Methods of making the esters of polylactic acid via direct and transesterification reactions are also disclosed.

12 Claims, 1 Drawing Sheet

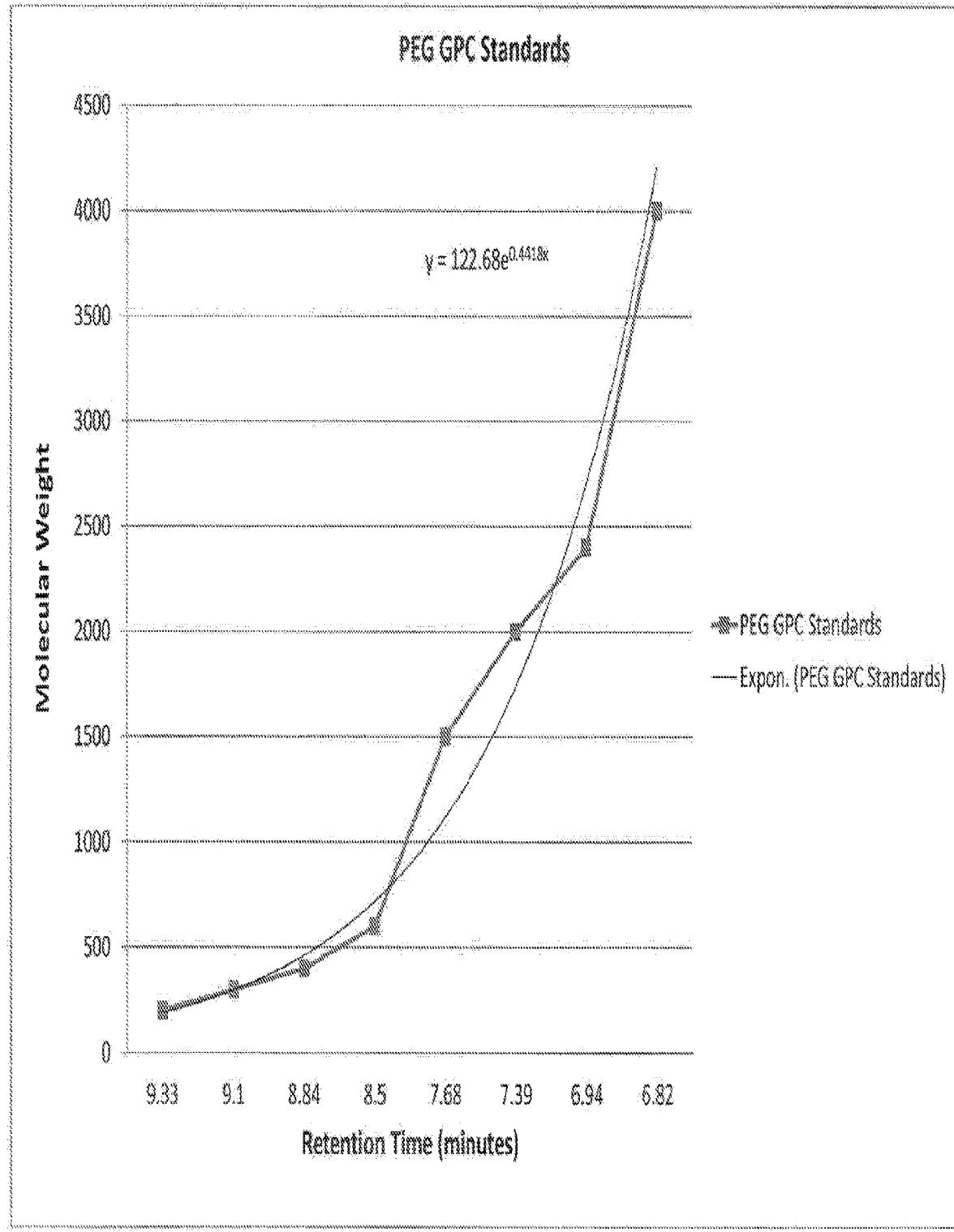

ESTERS OF POLYLACTIC ACID AND COMPOSITIONS THEREOF

FIELD OF THE INVENTION

The present invention relates to novel esters of polylactic acid and methods of making the novel esters. The present invention also relates to compositions including the novel esters.

BACKGROUND

High molecular weight polymers, such as polyesters and polyolefins, are commonly used to make fibers and fibrous articles, such as yarns, woven and knitted fabrics, and nonwoven fabric. Surfaces of items fabricated from polyesters and polyolefins are, by their chemical nature, hydrophobic. In many applications, it is desirable for the surface of an article to have hydrophilic properties. Topical coatings or finishes are often used on polyester and polyolefin articles to counter their hydrophobic nature and impart hydrophilicity. Polyesters, such as polylactic acid ("PLA") and polyolefins, can be used in many products, including absorbent products, such as diapers. Because polylactic acid can be derived from renewable sources like corn instead of petroleum, polylactic acid can be compostable and biodegradable. Polylactic acid has properties similar to polypropylene ("PP").

SUMMARY

In one aspect, the present invention relates to esters of polylactic acid (or "PLA"). In another aspect, the present invention relates to compositions including esters of polylactic acid that can be used as finishes on textiles (e.g., textiles made of polyester and polylactic acid) and polyolefins, such as polypropylene. The esters of polylactic acid can include diol (e.g., polyethylene glycol (or "PEG") and 1,3 propanediol) esters of polylactic acid and polyol (e.g., polyglycerol, sugars, and sugar alcohol) esters of polylactic acid, and/or combinations thereof.

In another aspect, the present invention relates to methods of manufacturing the esters of polylactic acid. Such esters of polylactic acid can be made by reacting (i) a diol and/or a polyol with (ii) polylactic acid, lactide, or lactic acid. Mixtures or combinations of diols and/or polyols can also be reacted with polylactic acid, lactide, or lactic acid to form esters of the present invention.

In another aspect, the present invention relates to textiles that are treated with compositions containing esters of polylactic acid. Esters of polylactic acid can be compostable and/or biodegradable and are, therefore, useful along with polylactic acid polymers to make products that can be compostable and/or biodegradable.

BRIEF DESCRIPTION OF THE DRAWINGS

FIG. 1 is a typical standard curve and calibration equation determination showing molecular weight versus retention time for PEG GPC standards.

DETAILED DESCRIPTION

In one aspect, the present invention relates to esters of PLA. In another aspect, the present invention relates to compositions that include esters of PLA. These compositions can be used as finishes on textiles made from polyester, such as PLA and polyolefins. The esters of PLA can also be useful as finishes on other synthetic polymers (e.g., polyamides, acrylics, nylons, polypropylene, and aramids) and man-made fibers (e.g., acetate, lyocell, and rayon). The esters of PLA can also be useful on natural fibers (e.g., bamboo, cotton, flax, hemp, and wool). Esters of PLA and compositions comprising esters of PLA are capable of coating the surface of a hydrophobic material, such as a textile made of PLA and/or polypropylene and are capable of changing the surface of the material from hydrophobic to hydrophilic or, if the material is already hydrophilic, increasing the hydrophilicity of the material. Thus, another aspect of the present invention is a material to which one or more esters of PLA are applied.

In one embodiment, the material can be a nonwoven textile, such as a spunbond, melt-blown, carded, air laid, wet laid, or combinations thereof. Examples of nonwoven textiles include polyester top sheets for diapers. In another embodiment, the textile can be a woven or knitted textile (e.g., garments, including sports clothing). Textiles include fibers, filaments, yarns, woven, nonwoven, and knitted fabrics.

In one embodiment, esters of PLA include PEG esters of PLA. In another embodiment, esters of PLA include 1,3 propanediol esters of PLA. In yet another embodiment, esters of PLA include polyol, for example polyglycerol, sugars, and/or sugar alcohols, esters of PLA. In a further embodiment, esters of PLA can include two or more of the following esters of PLA: PEG esters of PLA, 1,3 propanediol esters of PLA, polyol esters of PLA, and/or combinations thereof. The esters of PLA can include esters made by reacting (i) a diol (e.g., PEG or 1,3 propanediol), and/or a polyol (e.g., a glycerol, such as tri-, penta-, or deca-glycerol), or a sugar, or a sugar alcohol with (ii) PLA, lactide, or lactic acid. The lactide may be D-, L-, or DL-lactide. Thus, the esters of PLA can include PEG esters of PLA, glycerol esters of PLA, 1,3 propanediol esters of PLA, sugar esters of PLA, and sugar alcohol esters of PLA. In another embodiment, esters of PLA include PEG esters of PLA. In another embodiment, compositions include glycerol esters of PLA. In another embodiment, compositions include 1,3 propanediol esters of PLA. In another embodiment, compositions include sugar esters of PLA. In another embodiment, compositions include sugar alcohol esters of PLA. In another embodiment, the esters of PLA can include a combination of two or more PEG esters of PLA, glycerol esters of PLA, 1,3 propanediol esters of PLA, sugar esters of PLA, and sugar alcohol esters of PLA. The compositions can include water and/or another solvent with one or more esters of PLA to provide a finish for textiles.

In another aspect, the present invention relates to a method of making esters of PLA. In one embodiment, esters of the present invention can be made by reacting (i) a diol (e.g., PEG or 1,3 propanediol) and/or polyol (e.g., a polyglycol, a polyglycerol, including tri-, penta-, or deca-glycerol), or a sugar, or a sugar alcohol with (ii) PLA. The reaction can take place by heating the reactants with a catalyst. The catalyst may be a basic catalyst (e.g., sodium carbonate and/or calcium carbonate). The catalyst may also be a Lewis acid catalyst, such as stannous octoate. The reaction can take place without a catalyst. The reaction is conducted at temperatures sufficient to melt the PLA and to initiate the reaction to form the esters of PLA. Although the temperature to initiate the reaction between PEG and PLA can be 140° C. to 160° C., the temperature required to melt PLA is at least about 160° C. Thus, the reaction of PEG and PLA can take place between 160° C. and 200° C. or between 170° C.

and 190° C. A solvent can be used to dissolve the diol and/or polyol or a combination of diol and polyol to facilitate the reaction with PLA.

The initial PLA to diol and/or polyol weight percentages for the reactants can be between 25 and 75 percent PLA and 75 and 25 percent diol and/or polyol, between 30 and 70 percent PLA and 70 to 30 percent diol and/or polyol, between 35 and 65 percent PLA and 65 and 35 percent diol and/or polyol, between 40 and 60 percent PLA and 60 and 40 percent diol and/or polyol, and between 45 and 55 percent PLA and 55 and 45 percent diol and/or polyol. In one embodiment, the initial weight percent of PLA is greater than 50 percent of the reactants, and therefore, the initial weight percent of the diol and/or polyol is less than 50 percent of the reactants. The initial weight percent PEG to PLA ratio (PEG:PLA) can be between 75:25 and 25:75, between 70:30 and 30:70, between 65:35 and 35:65, between 60:40 and 40:60. The reaction temperature is typically between 160° C., and 200° C. or 170° C. to 190° C.

The reaction time required to provide sufficient yields of the esters of PLA can vary based on the molecular weight of the PLA, the diol and/or polyol, the temperature and pressure of the reaction, the use of a catalyst, and, in the case of direct esterification, the rate of removal of water during the reaction. The reaction time should be sufficient to achieve a suitable conversion of the PLA to esters of PLA to provide a clear, stable emulsion with water. The reaction time can be between 1 hour and 10 hours, between 2 hours and 6 hours, and between 3 and 5 hours after the temperature reaches the melting point temperature of PLA. Typically, the reaction is continued until a clear to hazy mass is formed indicating that the formation of the ester of polylactic acid is substantially completed (i.e., greater than 75, 80, 85, 90, or 95 percent conversion of PLA to the ester of PLA).

When a diol is reacted with the PLA, a diol-PLA and/or a diol-PLA-diol ester is formed. When a polyol is reacted with the PLA, a polyol-PLA and/or a polyol-PLA-polyol ester is formed. If lactic acid or lactide is used instead of PLA, the reaction time can be 2 to 8 hours. The ester formed by the reaction of polyethylene (PEG) and PLA (PLA) can form a PLA-PEG ester and a PLA-PEG ester that are represented by the following formulas:

Formula (I)

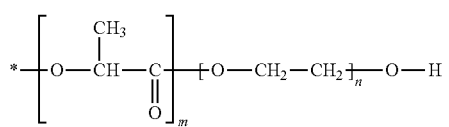

where m and n are integers greater than 1 and/or

Formula (II)

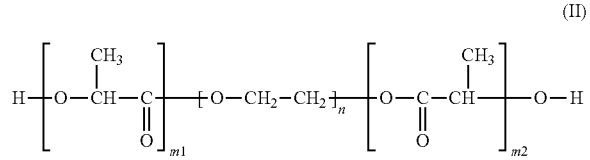

where m1 and m2 are integers greater than 1, and m1 and m2 can be equal or unequal. In another embodiment of the ester of formula (I), n can be an integer greater than 1 and less than 90, 80, 70, 60, 50, 40, 30, 20, or 10, and m can be an integer greater than 1 and less than 10. In another embodiment of the ester of formula (II), n can be an integer greater than 1 and less than 90, 80, 70, 60, 50, 40, 30, 20, or 10, and m1 and m2 can be integers greater than 1 and less than 10, and m1 and m2 can be equal or unequal.

The following non-limiting examples are provided to illustrate methods of making the PEG esters of PLA. The PLA used in each of the examples is a PLA manufactured and sold by NatureWorks under the tradename INGEO® 6302D. INGEO® 6302D is an amorphous thermoplastic fiber-grade resin having a crystalline melt temperature of about 125-135° C. Crystalline PLA, such as INGEO® 6202D, also manufactured and sold by NatureWorks® and having a melting point of about 165° C., can also be used to make esters of the present invention. PEGs of lower and higher molecular weights can be used in the process set forth in the examples below. The molecular weight of the PEG is a weight-average molecular weight.

Example 1

PEG 400 $M_w$ (129 g), PLA (100 g), and 0.41 g of sodium carbonate were heated in a flask for 240 minutes to 160° C. while being stirred. A sample of PEG ester of PLA was collected. Using gel permeation chromatography, the weight-average molecular weight of the PEG ester of PLA was determined to be about 600-650 grams per mol.

Example 2

PEG 400 $M_w$ (129 g), PLA (100 g), and 0.40 g of sodium carbonate were heated in a flask for 200 minutes to 180° C. while being stirred. A sample of PEG ester of PLA was collected. Using gel permeation chromatography, the weight-average molecular weight of the PEG ester of PLA was determined to be about 600-650 grams per mol.

Example 3

PEG 600 $M_w$ (129 g), PLA (100 g), and 0.40 g of sodium carbonate were heated in a flask for 200 minutes to 180° C. while being stirred. A sample of PEG ester of PLA was collected. Using gel permeation chromatography, the weight-average molecular weight of the PEG ester of PLA was determined to be about 900-950 grams per mol.

PEG having other weight-average molecular weights, for example 200, 800, 1000, 1200, 1400 daltons or greater than 200 daltons can be reacted with PLA to make PEG esters of PLA having other weight-average molecular weights using the procedure described above. The PEG:PLA can be reacted at different weight ratios as describe herein.

PLA is made from renewable materials, such as corn, sugarcane, sugar beet, and cassava. The PLA that can be used is not limited by molecular weight and can have a weight-average molecular weight ($M_w$) between (e.g., 10,000 and 150,000 daltons (g/mol)). PEG is typically made from petroleum but can also be made from all natural, renewable material, such as corn, sugarcane, sugar beet and cassava. Thus, the esters of PLA can be made from all-natural, renewable material and can be compostable and/or biodegradable. The weight-average molecular weight of the PEG units in the esters of PLA can be between 100 and 5000 daltons, between 100 and 4000 daltons, between 100 and 2000 daltons, between 100 and 1000 daltons, between 100 and 800 daltons, and between 100 and 600 daltons. In one embodiment, the weight-average molecular weight is about 400 daltons. The weight-average molecular weight of the PEG esters of PLA can be less than 5000 daltons, less than 4000 daltons, less than 3000 daltons, less than 2000 daltons, less than 1000 daltons, less than 975 daltons, less than 950 daltons, less than 900 daltons, less than 800 daltons, less than 700 daltons, less than 600 daltons, less than 500 daltons, or less than 400 daltons. The weight-average molecular weight of esters of PLA made by reacting diol or polyol with PLA can be less than 5000 daltons, less than 4000 daltons, less than 3500 daltons, less than 3000 daltons, less than 2500 daltons, less than 2000 daltons, less than 1500 daltons, less than 1000 daltons, less than 975 daltons, less than 950 daltons, less than 900 daltons, less than 800 daltons, less than 700 daltons, less than 600 daltons, less than 500 daltons, or less than 400 daltons.

The weight-average molecular weights of PEG esters of PLA can be determined by gel permeation chromatography ("GPC") using a standard High Performance Liquid Chromatography ("HPLC") system employing a GPC column and evaporative light scattering detection ("ELSD"). The following procedure was used to determine weight-average modular weight of PEG esters of PLA. Retention times of standards were fitted to a calibration equation, and this equation was used to determine weight-average molecular weight of an unknown polymer. The unknown polymer samples were prepared by using 0.02 g of sample to 1.5 mL of HPLC grade isopropyl alcohol ("IPA"). PEG polymers of various average molecular weights were also prepared and used as "standards" in order to formulate an exponential growth rate formula/curve used for the samples' molecular weight calculations. The standard PEGs were labeled by their weight-average molecular weight, so the results from the determination were that of weight-average molecular weight. Examples of a typical PEG standard set is set forth in Table 1 below.

TABLE 1

PEG GPC Standards

| PEG (Molecular Weight MW) | Retention Time (Minutes RT) |
|---|---|
| 200 | 9.33 |
| 300 | 9.1 |
| 400 | 8.84 |
| 600 | 8.5 |
| 1500 | 7.68 |
| 2000 | 7.39 |
| 2400 | 6.94 |
| 4000 | 6.82 |

The column used was a Jordi Gel DVB 500A (300×07.8 mm, Catalog number 15071). The method was isocratic employing Tetrahydrofuran ("THF") at 1 ml/min. Standard run time is 30 minutes, but most all components were eluded within 15 minutes. Detection was accomplished with an evaporative light scattering detector ("ELSD"). The ELSD unit employed was an Alltech 500 ELSD with ELSD LTA accessory. The LTA unit was set to operate at 41° C. The ELSD unit drift tube was set at 70° C., and nitrogen gas flow was set at 1.84 SLPM. In order to calculate molecular weights of the PLA:PEG samples analyzed, the average retention time for each PEG standard result was calculated. This was done by splitting the peak in half (by Area %=50/50). The retention time was then plotted along with the corresponding PEG weight average molecular weight, for example 200, 400, 600, 800, 1000, 1200, 1400, 1450. Once all PEG standards were plotted, a scatter plot was created, and an exponential trend line was fitted within an Excel spreadsheet. FIG. 1 is a typical standard curve and calibration equation determination showing molecular weight versus retention time for PEG GPC standards. The exponential equation was then used to calculate the weight average molecular weight. Like the standards, the average retention time was calculated by determining the time at which 50% of the area was on each side of the determined time.

In another embodiment, esters of the present invention can be made by direct esterification by reacting (i) a diol (e.g., PEG or 1,3 propanediol), and/or a polyol (e.g., a glycerol, such as tri-, penta-, or deca-glycerol), or a sugar, or a sugar alcohol with (ii) a lactide, lactide intermediate, or lactic acid. The lactide can be D-lactide, L-lactide, and/or DL-lactide. A solvent can be used to dissolve the diol or polyol or combination of diols and/or polyol to facilitate the reaction with the lactide, lactide intermediate, or lactic acid. The reaction can take place in the presence of a mineral acid (e.g., sulfuric acid or dry hydrogen chloride), which acts as a catalyst to speed up the reaction and to remove water. Removing water can also be accomplished, for example, by contacting, for example, sparging, the reaction mixture with an inert gas or a dry gas that does not interfere with the reaction, such as nitrogen, and/or by distilling the reaction products.

In another aspect of the present invention, the esters of PLA can be combined with other compounds or compositions that do not include esters of PLA to form a finish (i.e., a finish composition"). The weight percent of the ester or esters of PLA in the finish can be between 0.1 and 99.9 percent or between 5 and 95 percent of the weight of the esters of PLA. Examples of other compounds and/or compositions include water, lubricants, emulsifiers, anti-static agents, cohesion agents, anti-oxidants, anti-corrosion agents, viscosity modifiers, wetting agents, biocides, pH adjustment agents, soil release agents, and stain repellant agents. Exemplary lubricants include PEG fatty acid esters other than esters of PLA, ethoxylated fatty acids, ethoxylated triglycerides, glycerol esters, sorbitan esters, and alkyl esters, and/or combinations thereof derived from mineral oils, vegetable oils, and/or animal oils. Exemplary emulsifiers include nonionic agents (e.g., alkyl alcohol ethoxylates, alkyl phenol ethoxylates, fatty amine ethoxylates, and fatty acid ethoxylates, and/or combinations thereof); cationic agents (e.g., quaternary fatty amines, quaternary fatty amine ethoxylates, quaternary imidazolines and/or combinations thereof); and anionic agents (e.g., sulfates and phosphates of ethoxylated alkyl alcohols, fatty acid soaps, and/or sulfosuccinate alkyl esters and/or combinations thereof). Exemplary anti-static agents include nonionic agents (e.g., alcohol ethoxylates, alkyl phenol ethoxylates, fatty amine ethoxylates, polyoxyalkylene glycols, ethers, and/or esters and/or combinations thereof); cationic agents (e.g., quaternary amines, quaternary imidazolines, and/or combinations thereof); and anionic (e.g., alkyl alcohol sulfates, and/or phosphates, and/or alkyl alcohol ethoxylate sulfates, and/or phosphates, and/or combinations thereof).

A typical soil release formulation includes a permanent-press resin, a catalyst for permanent-press resin, a wetting agent, a high-density polyethylene resin, a fluorine-based soil release chemical, and acetic acid. The typical weight percentages of the compounds are: between 4.0 and 10.0 permanent-press resin, between 5.0 and 10.0 catalyst for permanent press resin, between 0.25 and 1.0 wetting agent, between 3.0 and 6.0 high-density polyethylene resin, between 5.0 and 10.0 fluorine-based soil release chemical, and between 0.0 and 0.25 acetic acid. PEG ester of PLA can be added to a soil release formulation containing a fluorine-based soil release chemical to the soil release agent so that the soil release agent can be more quickly absorbed into a fabric (e.g., less than 10 seconds, 5 seconds, 4 seconds, 3 seconds, or 2 seconds) as determined by applying one drop to the fabric, thus reducing the time to treat the fabric with the soil release agent. Additionally, when a PEG ester of PLA is added to a soil release formulation containing a fluorine-based soil release chemical, the amount of the fluorine-based chemical can be reduced by up to 25, 50, or 75 percent, and the soil release agent can still provide soil release results that are comparable or better than the soil release agent containing the typical amount (i.e., 5.0 to 10.0 weight percent) of fluorine-based chemical without the PEG ester of PLA.

Esters of PLA act as a surfactant and can be used in personal care products, for example soap, shampoo, and conditioner. Compositions comprising esters of PLA can include other surfactants, for example all-natural polyglucosides.

In yet another aspect, the present invention relates to textiles that are treated with the esters of PLA. Textiles treated with esters of the PLA have improved surface characteristics, such as hydrophilicity. In one embodiment, the textiles are nonwoven textiles, for example spunbond, meltblown, carded, air laid, wet laid, and/or combinations thereof. In another embodiment, the textiles are woven or knitted. In one embodiment, the textiles are made of or include polyester, for example PLA and/or polyethylene terephthalate. In another embodiment, the textiles are made of or include polypropylene. In another embodiment, the textiles are made of or include polyethylene. In another embodiment, the textiles are made of or include a combination of polypropylene and polyethylene. In another embodiment, the textiles are made of polyamides, acrylics, aramids, and/or combinations thereof. In another further embodiment, the textiles are made of or include man-made fibers (e.g., acetate, lyocell, and rayon). In another embodiment, the textiles are made of or include natural fibers (e.g., bamboo, cotton, flax, hemp, wool, and/or combinations thereof). In another embodiment, the textiles can be made of poly(p-phenylene-2,6-benzobisoxazole) also known as "PBO." In another embodiment the textiles can be made of polyether ether ketone, also known as "PEEK." In another embodiment, the textiles are made of polyether ketone ketone also known as "PEKK." Esters of PLA, when applied to textiles impart improved wetting characteristics (e.g., relatively fast strike-through and multiple strike-through times and/or relatively low rewet (or wetback).

Compositions comprising esters of PLA of the present invention can provide a single liquid strike-through time of 5 seconds or less on a 12 grams per square meter (gsm) spunbond nonwoven made of polypropylene or PLA, 4 seconds or less, or 3 seconds or less as determined by the EDANA (European Disposables and Nonwoven Association) and INDA (Association of the Nonwovens Fabrics Industry) Standard Test: WSP 070.3.R3(12) for Nonwoven Coverstock Liquid Strike-Through Time. The EDANA (European Disposables and Nonwoven Association) and INDA (Association of the Nonwovens Fabrics Industry) Standard Test: WSP 070.3.R3(12) for Nonwoven Coverstock Liquid Strike-Through Time is incorporated herein by reference. Compositions comprising esters of PLA of the present invention can provide multiple or repeated liquid strike-through times of 5 seconds or less for the first three strike-throughs on a 15 gsm PLA or polypropylene spunbond nonwoven or 4 seconds or less as determined by the Standard Test: WSP 070.7.R4(12) for Repeated Liquid Strike-Through Time. Standard Test: WSP 070.7.R4(12) for Repeated Liquid Strike-Through Time is incorporated herein by reference.

Compositions comprising esters of PLA of the present invention can also provide a rewet of at least 0.25 grams or less on a 12 gsm PLA spunbond nonwoven as determined by the Standard Test: WSP 080.10.R3(12) for Nonwovens Coverstock Wetback. Standard Test: WSP 080.10.R3(12) for Nonwovens Coverstock Wetback is incorporated herein by reference. The compositions comprising one or more esters of PLA typically include water so that the weight percent of one or more esters of PLA in the composition can be between 0.1 and 99.9 weight percent, between 0.1 and 80.0 weight percent, between 0.1 and 50.0 weight percent, 0.1 and 25.0 weight percent, 0.1 and 10.0 weight percent, or greater than 0.1 weight percent of one or more esters of PLA.

Compositions comprising esters of PLA can provide finishes, for example bleaching, scouring, hydrophilic, anti-static, soil release (or stain release), stain resistant, and anti-friction finishes, and/or combinations thereof. In one embodiment, PEG esters of PLA used in these finishes can be made from PEG 200, PEG 300, PEG 400, PEG 600, PEG 800, PEG 1000, PEG 1200, PEG 1400, PEG 1450, and/or mixtures thereof, which are commercially available. The PEG esters of PLA can also be made from PEG having molecular weights between 100 and 1000, between 200 and 800, and between 300 and 700. PEG esters of PLA can have PEG:PLA ratios between 30:70 and 70:30, between 40:60 and 60:40, and between 45:55 and 55:45. In a preferred embodiment, the PEG ester of PLA is made from PEG 400 and the PEG:PLA ratio is 50:50. PEG esters of PLA, namely a PEG 400 ester of PLA having a PEG:PLA ratio of 44:56, a PEG 200 ester of PLA having a 50:50 PEG:PLA ratio, a PEG 400 ester of PLA having a 50:50 PEG:PLA ratio, a PEG 600 ester of PLA having a PEG:PLA ratio of 50:50, a PEG 1450 ester of PLA having a PEG:PLA ratio of 50:50 have favorable smoke and flashpoint point characteristics (i.e., smoke is less than 171° F. and flash is less than 244° F.) and favorable friction characteristics. For example, a soil release finish can comprise PEG esters of PLA, such as those identified above, an oil/water repellent, a wetting/wicking agent, and a hydrophilic binder. In one embodiment, the soil release finish includes an ester of PLA, permanent press resin, a catalyst for the permanent-press resin, a wetting agent, a high-density polyethylene resin, a fluorine-based soil release chemical, and/or an acid for pH adjustment (e.g., acetic acid, citric acid, or glycolic acid). The addition of an ester of PLA can reduce the requirement for the expensive fluorine-based soil release chemical by up to 10 percent, 20 percent, 30 percent, 40 percent, 50 percent, or 60 percent while providing comparable or improved soil release results. The addition of the ester of PLA improves the drop reflectance. One liter of soil release finish can comprise between 1 and 40 grams, between 1 and 30 grams, between 1 and 20 grams, between 1 and 15 grams, or between 1 and 10 grams of PEG esters of PLA. Two liters of finish can comprise twice the one-liter amounts of PEG ester of PLA, three liters of finish can comprise three times the one-liter amounts of PEG ester of PLA, and so forth.

Compositions comprising esters of PLA can be applied to textiles by roll coating, padding, dripping, or spraying in an amount that provides the desired strike-through and/or rewet characteristics. For example, the compositions comprising esters of PLA can be applied to provide a finish on yarn (FOY) level between 0.1 and 10.0 weight percent FOY, between 0.2 and 3.0 weight percent, between 0.3 and 1.0 weight percent, and between 0.3 and 0.8 weight percent. Thus, another aspect of the present invention are textiles treated with one or more esters of PLA described above or compositions containing one or more esters of PLA described above.

Results of tests comparing conventional soil release formulations without the PEG ester of PLA and the soil release formulations with PEG ester of PLA are presented in Tables 2b-2c, 3b-3c, 4b-4c, 5b-5d, 6b-6d, and 7b-7d below. Soil release formulations containing PEG esters of PLA were tested on 100 percent polyester, polyester/cotton blend (65:35 weight percent poly/cotton), and nylon fabrics. The results were compared to NONAX® MM, a conventional polyester copolymer used as a release agent sold by Pulcra Chemicals.

Polyester copolymers are used to make synthetic fibers absorb or wick water, particularly for apparel and sports fabrics. Polyester copolymers also claim to improve the soil release properties of the fabric. The PEG esters of PLA were also tested to determine if PEG esters of PLA would improve static electricity on textiles. Three esters of PLA were compared to a common polyester copolymer finish sold by Pulcra Chemicals LLC under the tradename NONAX® MM. NONAX® MM and the PEG ester of PLA were applied to the fabric by pad method and then dried and cured on the fabric. The formulation was applied to 100% Polyester fabric, 65/35 weight percent Polyester/Cotton fabric, and 100% Nylon fabric. To determine wicking, one end of a strip of treated fabric was immersed in water allowing the water to wick up the fabric. The higher the water wicked up the fabric, the better the wicking property. The distance that the water wicked up the fabric was measured in millimeters ("mm"). When measuring wicking properties of esters of PLA in soil release agents, the soil release agent formulations below were padded and then dried and cured on the fabric at 177° C. Soil release formulas and results of the tests are set forth in the Tables below. Washing of the fabrics for the testing discussed below was performed in accordance with the current AATCC Test Method 135.

TABLE 2a

100% Polyester Wicking Test

| | Wicking | |
|---|---|---|
| | Initial | 5X Wash Cycles |
| Water Only | 2 mm | 50 mm |
| 5.0% NONAX ® MM | 82 mm | 95 mm |
| 1.25% PEG 400 | 73 mm | 65 mm |
| 1.25% PEG 400 w Citric Acid | 64 mm | 77 mm |
| 1.25% PEG 600 | 75 mm | 87 mm |

TABLE 2b

100% Polyester Soil Release Test - Initial

| | Soil Release Corn Oil | Initial Mineral Oil | Motor Oil | Dirty Motor Oil | Ketchup | Mustard |
|---|---|---|---|---|---|---|
| Water Only | 4 | 4 | 3 | 1 | 2 | 4 |
| 5.0% NONAX ® MM | 5 | 5 | 5 | 2 | 2.5 | 5 |
| 1.25% PEG 400 | 4 | 4 | 3 | 1 | 3 | 5 |
| 1.25% PEG 400 w Citric Acid | 3 | 5 | 4 | 0 | 3.5 | 4 |
| 1.25% PEG 600 | 4 | 5 | 3.5 | 0 | 3 | 4 |

TABLE 2c

100% Polyester Soil Release Test - 5 Wash Cycles

| | Soil Release Corn Oil | 5 Wash Cycles Mineral Oil | Motor Oil | Dirty Motor Oil | Ketchup | Mustard |
|---|---|---|---|---|---|---|
| Water Only | 4 | 4 | 2.5 | 0 | 2 | 4 |
| 5.0% NONAX ® MM | 5 | 5 | 3 | 0 | 2 | 5 |
| 1.25% PEG 400 | 4 | 4 | 3 | 0 | 2 | 5 |
| 1.25% PEG 400 w Citric Acid | 3 | 4 | 2 | 0 | 3 | 4 |
| 1.25% PEG 600 | 4 | 4 | 3 | 0 | 2 | 4 |

TABLE 2d

100% Polyester Anti-Static Test - % on weight of goods (% owg)

| | Initial | | After 5 Wash Cycles | |
|---|---|---|---|---|
| | Time to 75 V | Final Static | Time to 75 V | Final Static |
| Water | N/A | 149.0 | N/A | 138.0 |
| | N/A | 150.8 | N/A | 143.4 |
| | N/A | 149.9 | N/A | 139.2 |
| Average | N/A | 149.9 | N/A | 140.2 |
| 5.0% owg NONAX ® MM | N/A | 10.9 | N/A | 149.0 |
| | N/A | 25.7 | N/A | 146.3 |
| | N/A | 20.1 | N/A | 146.6 |
| Average 1.25% owg PEG 400 | N/A | 18.9 | N/A | 147.3 |
| | N/A | 146.0 | N/A | 134.1 |
| | N/A | 148.5 | N/A | 127.6 |
| | N/A | 146.2 | N/A | 131.2 |
| Average 1.25% owg PEG 400 w/ Citric | N/A | 146.9 | N/A | 131.0 |
| | N/A | 146.2 | N/A | 95.6 |
| | N/A | 149.3 | N/A | 93.1 |
| | N/A | 145.0 | N/A | 93.9 |

TABLE 2d-continued

100% Polyester Anti-Static Test - % on weight of goods (% owg)

|  | Initial | | After 5 Wash Cycles | |
|---|---|---|---|---|
|  | Time to 75 V | Final Static | Time to 75 V | Final Static |
| Average | N/A | 146.8 | N/A | 94.2 |
| 1.25% owg PEG | N/A | 146.0 | N/A | 140.0 |
| 600 | N/A | 149.7 | N/A | 144.6 |
|  | N/A | 148.4 | N/A | 149.7 |
| Average | N/A | 148.0 | N/A | 144.8 |

TABLE 3

65% Polyester/50% Cotton Wicking Test

|  | Wicking | |
|---|---|---|
|  | Initial | 5X Wash Cycles |
| Water Only | 51 mm | 70 mm |
| 5.0% NONAX ® MM | 70- mm | 70 mm |
| 1.25% PEG 400 | 62 mm | 75 mm |
| 1.25% PEG 400 w Citric Acid | 63 mm | 72 mm |
| 1.25% PEG 600 | 62 mm | 74 mm |

TABLE 3b

65% Polyester/50% Cotton Soil Release Test - Initial

|  | Soil Release Corn Oil | Initial Mineral Oil | Motor Oil | Dirty Motor Oil | Ketchup | Mustard |
|---|---|---|---|---|---|---|
| Water Only | 2 | 4 | 1 | 0 | 4 | 4 |
| 5.0% NONAX ® MM | 2 | 4 | 1 | 1 | 3.5 | 4 |
| 1.25% PEG 400 | 2 | 3 | 1 | 0 | 4 | 3 |
| 1.25% PEG 400 w Citric Add | 2 | 3 | 1 | 0 | 4 | 4 |
| 1.25% PEG 600 | 1 | 3 | 0 | 0 | 4 | 4 |

TABLE 3c

65% Polyester/50% Cotton Soil Release Test - 5 Wash Cycles

|  | Soil Release Corn Oil | 5 Wash Cycles Mineral Oil | Motor Oil | Dirty Motor Oil | Ketchup | Mustard |
|---|---|---|---|---|---|---|
| Water Only | 2 | 4 | 1 | 1 | 4 | 4 |
| 5.0% NONAX ® MM | 2 | 3 | 1 | 1 | 4 | 4 |
| 1.25% PEG 400 | 2 | 2 | 1 | 0 | 4 | 4 |
| 1.25% PEG 400 w Citric Acid | 2 | 2 | 0 | 0 | 4 | 4 |
| 1.25% PEG 600 | 1 | 2 | 0 | 0 | 3.5 | 4 |

TABLE 4a

100% Nylon Wicking Test

|  | Wicking | |
|---|---|---|
|  | Initial | 5X Wash Cycles |
| Water Only | 12 mm | 8 mm |
| 5.0% NONAX ® MM | 57 mm | 64 mm |
| 1.25% PEG 400 | 43 mm | 21 mm |
| 1.25% PEG 400 w Citric Acid | 37 mm | 25 mm |
| 1.25% PEG 600 | 51 mm | 11 mm |

TABLE 4b

100% Nylon Soil Release Test - Initial

| | Soil Release Corn Oil | Initial Mineral Oil | Motor Oil | Dirty Motor Oil | Ketchup | Mustard |
|---|---|---|---|---|---|---|
| Water Only | 3.5 | 5 | 3 | 1 | 4 | 2 |
| 5.0% NONAX ® MM | 5 | 4 | 4 | 4 | 4 | 2 |
| 1.25% PEG 400 | 4 | 4 | 3 | 0 | 4 | 1 |
| 1.25% PEG 400 w Citric Acid | 4 | 4 | 3 | 0 | 4 | 2 |
| 1.25% PEG 600 | 4 | 4 | 2.5 | 1 | 4 | 1 |

TABLE 4c

100% Nylon Soil Release Test - 5 Wash Cycles

| | Soil Release Corn Oil | 5 Wash Cycles Mineral Oil | Motor Oil | Dirty Motor Oil | Ketchup | Mustard |
|---|---|---|---|---|---|---|
| Water Only | 4 | 2 | 2 | 0 | 3.5 | 1 |
| 5.0% NONAX ® MM | 5 | 4 | 3 | 2 | 4 | 2.5 |
| 1.25% PEG 400 | 4 | 4 | 3 | 1 | 4 | 3 |
| 1.25% PEG 400 w Citric Acid | 4 | 5 | 2.5 | 1.5 | 4 | 3 |
| 1.25% PEG 600 | 4 | 4 | 3 | 1 | 4.5 | 2.5 |

TABLE 4d

100% Nylon Anti-Static Test

| | Initial | | After 5 Wash Cycles | |
|---|---|---|---|---|
| | Time to 75 Volts | Final Static | Time to 75 Volts | Final Static |
| | N/A | 145.1 | N/A | 144.8 |
| Water | N/A | 144.6 | N/A | 146.7 |
| | N/A | 143.1 | N/A | 142.4 |
| Average | N/A | 144.3 | N/A | 144.6 |
| 5.0% owg | N/A | 125.7 | N/A | 143.2 |
| NONAX ® | N/A | 131.0 | N/A | 146.1 |
| MM | N/A | 133.5 | N/A | 144.3 |
| Average | N/A | 130.1 | N/A | 144.5 |
| 1.25% owg | N/A | 105.0 | N/A | 143 |
| PEG 400 | N/A | 120.1 | N/A | 147.3 |
| | N/A | 124.4 | N/A | 143.5 |
| Average | N/A | 116.5 | N/A | 144.6 |
| 1.25% owg | N/A | 121.7 | N/A | 145.2 |
| PEG 400 | N/A | 127.5 | N/A | 143 |
| w/ Citric | N/A | 126.8 | N/A | 143.1 |
| Average | N/A | 125.3 | N/A | 143.8 |
| 1.25% owg | N/A | 115.2 | N/A | 144.7 |
| PEG 600 | N/A | 113.8 | N/A | 143.4 |
| | N/A | 117.9 | N/A | 146 |
| Average | N/A | 115.6 | N/A | 144.7 |

Wicking and soil release testing was repeated as described on 100 percent polyester, 65 percent/35 percent polyester/cotton, and 100 percent nylon as described above. Results for 100 percent polyester are shown in Tables 5b-5d below. The pH of the soil release agents was adjusted to a pH to 4-5. Subsequent soil release agent testing was repeated on 100 percent polyester as described above. The test results for wicking, soil release on the initial fabric before washing with a detergent, after five wash cycles, and after ten wash cycles, and whiteness are shown in Table 5a-5e below. The same washing procedure was used for all wash cycles for all samples. The pH for each soil release agent was adjusted to a pH to 4-5.

TABLE 5a

100% Polyester Wicking Test

| | Wicking | | |
|---|---|---|---|
| | Initial | 5 Wash Cycles | 10 Wash Cycles |
| #1 Water | 5 mm | 50 mm | 79 mm |
| #2 4.0% owg NONAX ® MM - Control | 78 mm | 80 mm | 92 mm |
| #3 1.00% owg (PLA-PEG 400) | 58 mm | 81 mm | 62 mm |
| #4 2.00% owg (PLA-PEG 400) | 58 mm | 51 mm | 72 mm |
| #5 1.00% owg (50:50 PLA & PEG 400) | 57 mm | 91 mm | 71 mm |
| #6 2.00% owg (50:50 PLA & PEG 400) | 74 mm | 87 mm | 100 mm |
| #7 1.00% owg (PLA-PEG 600) | 83 mm | 96 mm | 95 mm |
| #8 2.00% owg (PLA-PEG 600) | 84 mm | 99 mm | 101 mm |

TABLE 5b

100% Polyester Soil Release Test - Initial

| | Soil Release Mineral Oil | Corn Oil | Initial Motor Oil | Dirty Motor Oil | Ketchup | Mustard |
|---|---|---|---|---|---|---|
| #1 Water | 4 | 4 | 4 | 0 | 4 | 5 |
| #2 4.0% owg NONAX ® MM | 4 | 4 | 4 | 1 | 5 | 5 |
| #3 1.00% owg (PLA-PEG 400) | 4 | 4 | 3 | 0 | 4 | 4 |
| #4 2.00% owg (PLA-PEG 400) | 4 | 4 | 3.5 | 1 | 4 | 4 |

TABLE 5b-continued

100% Polyester Soil Release Test - Initial

| | Soil Release Mineral Oil | Corn Oil | Initial Motor Oil | Dirty Motor Oil | Ketchup | Mustard |
|---|---|---|---|---|---|---|
| #5 1.00% owg (50:50 PLA & PEG 400) | 4 | 4 | 3.5 | 0 | 4 | 4 |
| #6 2.00% owg (50:50 PLA & PEG 400) | 4.5 | 4 | 3 | 1 | 4 | 45 |
| #7 1.00% owg (PLA-PEG 600) | 4.5 | 4.5 | 3.5 | 0 | 4.5 | 4.5 |
| #8 2.00% owg 07896-169 (PLA-PEG 600) | 4.5 | 4.5 | 4.5 | 1 | 4.5 | 5 |

TABLE 5c

100% Polyester Soil Release Test - 5 Wash Cycles

| | Soil Release Mineral Oil | Corn Oil | 5 Wash Cycles Motor Oil | Dirty Motor Oil | Ketchup | Mustard |
|---|---|---|---|---|---|---|
| #1 Water | 4.5 | 4 | 3.5 | 1 | 4 | 4.5 |
| #2 4.0% owg NONAX ® MM | 4 | 4 | 3.5 | 1 | 4 | 4.5 |
| #3 1.00% owg (PLA-PEG 400) | 4.5 | 4 | 3 | 1 | 4 | 4.5 |
| #4 2.00% owg (PLA-PEG 400) | 4.5 | 4 | 3.5 | 0 | 3.5 | 4.5 |
| #5 1.00% owg (50:50 PLA & PEG 400) | 4.5 | 4 | 3.5 | 0 | 3.5 | 4 |
| #6 2.00% owg (50:50 PLA & PEG 400) | 4 | 4 | 3.5 | 1 | 4 | 4 |
| #7 1.00% OWG (PLA-PEG 600) | 5 | 3.5 | 3 | 1 | 4 | 4 |
| #8 2.00% OWG (PLA-PEG 600) | 5 | 4 | 3 | 1 | 4 | 4.5 |

TABLE 5d

100% Polyester Soil Release Test - 10 Wash Cycles

| | Soil Release Mineral Oil | Corn Oil | 10 Wash Cycles Motor Oil | Dirty Motor Oil | Ketchup | Mustard |
|---|---|---|---|---|---|---|
| #1 Water | 4 | 3.5 | 3 | 1 | 3.5 | 4 |
| #2 4.0% owg NONAX ® MM | 4.5 | 4 | 4 | 1 | 3.5 | 5 |
| #3 1.00% owg (PLA-PEG 400) | 4.5 | 4.5 | 3.5 | 1 | 3.5 | 5 |
| #4 2.00% owg (PLA-PEG 400) | 4.5 | 4 | 4.5 | 1 | 4.5 | 4.5 |
| #5 1.00% owg (50:50 PLA & PEG 400) | 4.5 | 4 | 4.5 | 1 | 3.5 | 4 |
| #6 2.00% owg (50:50 PLA & PEG 400) | 4.5 | 4 | 3.5 | 1 | 3.5 | 5 |
| #7 1.00% owg (PLA-PEG 600) | 4, .5 | 4.5 | 3 | 1 | 3.5 | 4.5 |
| #8 2.00% owg (PLA-PEG 600) | 4.5 | 4.5 | 3 | 1 | 4 | 5 |

TABLE 5e

100% Polyester - Whiteness Test

| | Whiteness Values | | |
|---|---|---|---|
| | Polyester | Poly/Cotton | Nylon |
| #1 Water | 84.84 | 101.52 | 83.22 |
| #2 4.0 % owg NONAX ® MM | 82.25 | 103.38 | 76.25 |
| #3 1.00% owg (PLA-PEG 400) | 64.49 | 96.64 | 54.88 |
| #4 2.00% owg (PLA-PEG 400) | 59.23 | 73.14 | 33.55 |
| #5 1.00% owg (50:50 PLA & PEG 400) | 81.8 | 102.27 | 77.98 |
| #6 2.00% owg (50:50 PLA & PEG 400) | 81.53 | 102.85 | 78.84 |
| #7 1.00% owg (PLA-PEG 600) | 81.53 | 102.41 | 81.54 |
| #8 2.00% owg (PLA-PEG 600) | 80.16 | 103.35 | 75.98 |

Subsequent wicking agent and soil release agent testing was repeated on 65/35 percent polyester/cotton as described above. The tests results for wicking and soil release agents on the initial fabric before washing, after five wash cycles, and after ten wash cycles are shown in Tables 6a-6d below. The pH for each soil release agent was adjusted to a pH between 4-5.

TABLE 6a

65/35% Poly/Cotton Wicking Test

| | Wicking | | |
|---|---|---|---|
| | Initial | 5 Wash Cycles | 10 Wash Cycles |
| #1 Water | 42 mm | 51 mm | 60 mm |
| #2 4.0 % owg NONAX ® MM | 54 mm | 50 mm | 58 mm |
| #3 1.00% owg (PLA-PEG 400) | 49 mm | 59 mm | 60 mm |
| #4 2.00% owg (PLA-PEG 400) | 48 mm | 60 mm | 59 mm |
| #5 1.00% owg (50:50 PLA & PEG 400) | 49 mm | 62 mm | 59 mm |
| #6 2.00% owg (50:50 PLA & PEG 400) | 45 mm | 60 mm | 58 mm |
| #7 1.00% owg ( PLA-PEG 600) | 52 mm | 56 mm | 57 mm |
| #8 2.00% OWG 07896-169 (PLA-PEG 600) | 53 mm | 55 mm | 59 mm |

TABLE 6b

65/35% Poly/Cotton Soil Release Test - Initial

| | Soil Release Mineral Oil | Corn Oil | Initial Motor Oil | Dirty Motor Oil | Ketchup | Mustard |
|---|---|---|---|---|---|---|
| #1 Water | 5 | 4.5 | 4.5 | 1 | 3.5 | 3 |
| #2 4.0% owg NONAX ® MM | 5 | 4.5 | 4 | 1.5 | 4 | 3.5 |
| #3 1.00% owg (PLA-PEG 400) | 4.5 | 4.5 | 4.5 | 1 | 3.5 | 3 |
| #4 2.00% owg (PLA-PEG 400) | 4.5 | 4.5 | 4.5 | 1 | 3.5 | 3 |
| #5 1.00% owg (50:50 PLA & PEG 400) | 4.5 | 4.5 | 4.5 | 1 | 3.5 | 3 |
| #6 2.00% owg (50:50 PLA & PEG 400) | 4.5 | 4.5 | 4.5 | 1 | 3.5 | 3 |
| #7 1.00% owg (PLA-PEG 600) | 4.5 | 4.5 | 4.5 | 1 | 3.5 | 3.5 |
| #8 2.00% owg (PLA-PEG 600) | 4.5 | 4.5 | 4.5 | 1 | 3.5 | 3.5 |

TABLE 6C

65/35% Poly/Cotton Soil Release Test - 5 Wash Cycles

| | Soil Release Mineral Oil | Corn Oil | 5 Wash Cycles Motor Oil | Dirty Motor Oil | Ketchup | Mustard |
|---|---|---|---|---|---|---|
| #1 Water | 5 | 4.5 | 4 | 1 | 23.5 | 3.5 |
| #2 4.0% owg NONAX ® MM | 5 | 4.5 | 4.5 | 1.5 | 4 | 3.5 |
| #3 1.00% owg (PLA-PEG 400) | 5 | 4.5 | 4.5 | 1 | 4 | 3.5 |
| #4 2.00% owg (PLA-PEG 400) | 4 | 4.5 | 4 | 1 | 3.5 | 3 |
| #5 1.00% owg (50:50 PLA & PEG 400) | 5 | 4 | 4 | 1 | 3.5 | 3.5 |
| #6 2.00% owg (50:50 PLA & PEG 400) | 4.5 | 4.5 | 4 | 1 | 3.5 | 3.5 |
| #7 1.00% owg (PLA-PEG 600) | 4 | 3.5 | 3.5 | 1 | 3.5 | 3.5 |
| #8 2.00% owg (PLA-PEG 600) | 4 | 4 | 3.5 | 1 | 3.5 | 3.5 |

TABLE 6d

65/35% Poly/Cotton Soil Release Test - 10 Wash Cycles

| | Soil Release Mineral Oil | Corn Oil | 10 Wash Cycles Motor Oil | Dirty Motor Oil | Ketchup | Mustard |
|---|---|---|---|---|---|---|
| #1 Water | 4.5 | 4 | 4 | 1 | 3.5 | 3 |
| #2 4.0% owg NONAX ® MM | 5 | 4.5 | 4.5 | 1 | 3.5 | 3 |
| #3 1.00% owg (PLA-PEG 400) | 4.5 | 4.5 | 4 | 1 | 3.5 | 3 |
| #4 2.00% owg (PLA-PEG 400) | 4.5 | 4.5 | 4 | 1 | 3 | 3 |
| #5 1.00% owg (50:50 PLA & PEG 400) | 4.5 | 4 | 3.5 | 1 | 3 | 3 |
| #6 2.00% owg (50:50 PLA & PEG 400) | 4.5 | 4.5 | 3.5 | 1 | 3.5 | 3 |
| #7 1.00% owg (PLA-PEG 600) | 5 | 5 | 3.5 | 1 | 3.5 | 3 |
| #8 2.00% owg (PLA-PEG 600) | 5 | 4 | 4 | 1 | 3.5 | 3 |

Subsequent wicking agent and soil release agent testing was repeated on 100% nylon 6, knit test fabric style 304 as described above. The test results for wicking and soil release agents on the initial fabric before washing, after five wash cycles, and after ten wash cycles are shown in Tables 7a-7d below. The pH for each soil release agent was adjusted to a pH to 4-5.

TABLE 7a

100% Nylon 6 Test Wicking

| | Wicking | | |
|---|---|---|---|
| | Initial | 5 Wash Cycles | 10 Wash Cycles |
| #1 Water | 14 mm | 31 mm | 21 mm |
| #2 4.0 % owg NONAX ® MM | 28 mm | 15 mm | 23 mm |
| #3 1.00% (PLA-PEG 400) | 33 mm | 23 mm | 28 mm |
| #4 2.00% (PLA-PEG 400) | 34 mm | 15 mm | 26 mm |
| #5 1.00% (50:50 PLA & PEG 400) | 32 mm | 15 mm | 25 mm |
| #6 2.00% owg (50:50 PLA & PEG 400) | 29 mm | 46 mm | 27 mm |
| #7 1.00% owg (PLA-PEG 600) | 38 mm | 10 mm | 35 mm |
| #8 2.00% owg (PLA-PEG 600) | 39 mm | 23 mm | 33 mm |

TABLE 7b

100% Nylon 6 Soil Release Test - Initial

| | Soil Release Mineral Oil | Corn Oil | Initial Motor Oil | Dirty Motor Oil | Ketchup | Mustard |
|---|---|---|---|---|---|---|
| #1 Water | 4 | 3.5 | 4 | 2 | 4 | 3 |
| #2 4.0% owg NONAX ® MM | 5 | 3.5 | 4 | 2.5 | 4 | 3.5 |
| #3 1.00% owg (PLA-PEG 400) | 4 | 5 | 3.5 | 2 | 4.5 | 3.5 |
| #4 2.00% owg (PLA-PEG 400) | 5 | 5 | 3.5 | 1.5 | 4.5 | 3.5 |
| #5 1.00% owg (50:50 PLA & Peg 400) | 5 | 5 | 3.5 | 1.5 | 4.5 | 3.5 |
| #6 2.00% owg (50:50 PLA & Peg 400) | 5 | 5 | 3.5 | 1.5 | 4.5 | 3 |
| #7 1.00% OWG ( PLA-PEG 600) | 5 | 5 | 3.5 | 1.5 | 4.5 | 3 |
| #8 2.00% OWG ( PLA-PEG 600) | 5 | 5 | 3.5 | 1.5 | 4.5 | 3 |

TABLE 7c

100% Nylon 6 Soil Release Test - 5 Wash Cycles

| | Soil Release Mineral Oil | Corn Oil | 5 Wash Cycles Motor il | Dirty Motor Oil | Ketchup | Mustard |
|---|---|---|---|---|---|---|
| #1 Water | 4.5 | 4.5 | 3.5 | 2 | 4.5 | 3.5 |
| #2 4.0% owg NONAX ® MM | 5 | 4.5 | 3.5 | 2 | 4.5 | 3.5 |
| #3 1.00% owg (PLA-PEG 400) | 5 | 4.5 | 3.5 | 1.5 | 4.5 | 3 |
| #4 2.00% owg (PLA-PEG 400) | 5 | 5 | 3.5 | 2 | 4.5 | 3 |
| #5 1.00% owg (50:50 PLA & PEG 400) | 5 | 5 | 4 | 2.5 | 5 | 3 |
| #6 2.00% owg (50:50 PLA & PEG 400) | 5 | 4.5 | 4 | 2.5 | 5 | 3 |
| #7 1.00% owg (PLA-PEG 600) | 5 | 5 | 3.5 | 2.5 | 4.5 | 3 |
| #8 2.00% owg (PLA-PEG 600) | 5 | 5 | 3.5 | 2.5 | 4.5 | 3.5 |

TABLE 7d

100% Nylon 6 Soil Release Test - 10 Wash Cycles

| | Soil Release Mineral Oil | Corn Oil | 10 Wash Cycles Motor Oil | Dirty Motor Oil | Ketchup | Mustard |
|---|---|---|---|---|---|---|
| #1 Water | 4.5 | 4.5 | 3.5 | 2 | 4 | 3 |
| #2 4.0% owg NONAX ® MM | 5 | 5 | 3.5 | 2.5 | 4.5 | 3 |
| #3 1.00% owg (PLA-PEG 400) | 4 | 4 | 3.5 | 2 | 4 | 3 |
| #4 2.00% owg (PLA-PEG 400) | 4.5 | 4.5 | 3.5 | 2.5 | 4.5 | 2.5 |
| #5 1.00% owg (50:50 PLA & PEG 400) | 4 | 4 | 3 | 2 | 4.5 | 3 |
| #6 2.00% owg (50:50 PLA & PEG 400) | 4 | 4 | 3.5 | 2.5 | 4.5 | 3 |
| #7 1.00% owg (PLA-PEG 600) | 4.5 | 4.5 | 3.5 | 2.5 | 4.5 | 3 |
| #8 2.00% owg (PLA-PEG 600) | 4.5 | 4.5 | 4 | 2.5 | 4.5 | 3 |

The test results shown in Tables 2a, 3a, 4a, 5a, 6a, and 7a above demonstrate that the PEG esters of PLA proved to be good wicking agents on all three types of fabric (polyester, polyester/cotton, and nylon), and can be biodegradeable and/or compostable.

Esters of PLA were tested for use as scouring agents. Esters of PLA were used instead of a conventional foaming agent for scouring fabric. For the surfactant evaluation tests, percent active matter content was adjusted to result in equivalent percent solids. Fabric wetting tests ("wetting tests") show how fast a surfactant will wet out 100% greige cotton circles. All products were tested at 1, 2 and 4 g/l concentrations as is with no adjustments made for active matter content. These tests were run in duplicate and then averaged. Drop Absorbancy is time in seconds for one drop of water to disappear. In this part of the evaluation, the PLA surfactants & SYNTERGENT® APW are part of a chemical formulation applied to fabric & tested. Waring Blender Foaming Test is used to measure the foam height produced using a 1 g/l solution of each surfactant tested. The foam height is measure immediately after 60 seconds blending and after 30 seconds. The second measurement shows how stable the foam formation is after standing for 30 seconds. This test method is used for high turbulent processing equipment, such as jet machines. Caustic Soda Alkali Stability Test measures the amount of caustic soda 100% a surfactant is stable in after four-hour duration in different caustic soda solutions. Our standard test is to run caustic soda solutions of 1-6% NaOH 100%. A 5 g/l amount of each surfactant is added to each caustic soda level.

A 65/35 weight percent greige poly cotton twill woven fabric sized without starch was used to evaluate each surfactant in a standard single stage bleaching evaluation. For this evaluation the same bleach formulation was used for each surfactant evaluation. However equal active matter amounts of each surfactant were used for a true comparison of the wetting, detergency and size remove properties for each surfactant.

Single Stage Fabric Bleaching Formulation & Procedure
Chemical Formulation
10.0 g/l Surfactant SYNTERGENT® APW vs SYNTERGENT® APW PLA modifications (SYNTERGENT® is sold by Pulcra Chemicals LLC)
7.0 g/l SECURON® 540 sold by Pulcra Chemicals LLC
14.6 g/l Sodium Silicate 42° Be'
37.4 g/l Caustic Soda 50%
53.7 g/l Hydrogen Peroxide 50%

Bleaching Procedure
1. Saturate fabrics for wet pick-up. (Will vary with fabric type)
2. Steam fabrics for 20 minutes at 100° C.
3. Wash/rinse fabrics eight times at 180° F. minimum
4. Extract & Dry fabrics

TABLE 8

| Material Solids/Dilution Ratio | | |
| --- | --- | --- |
| Material | % Active Matter | *Dilution Ratio |
| Standard Foaming Agent | 49.52 | — |
| PLA-PEG 200 crystalline | 100 | 1:1.01 |
| PLA-PEG 400 crystalline | 100 | 1:1.01 |

TABLE 8-continued

| Material Solids/Dilution Ratio | | |
| --- | --- | --- |
| Material | % Active Matter | *Dilution Ratio |
| PLA-PEG 600 crystalline | 100 | 1:1.01 |
| PLA Decaglycerol | 100 | 1:1.01 |
| PLA Zemea | 100 | 1:1.01 |
| PLA Triglycerol | 25 | **1.98 |
| PLA Pentaglycerol | 100 | 1:1.01 |
| PLA-PEG 1450 | 100 | 1:1.01 |
| PLA-PEG 4000 crystalline | 100 | 1:1.01 |

*First number is parts material, Second number is parts of water to achieve equivalent solids equal to a standard foaming agent.
**No dilution, just double conc. in formula mix As shown in Table 9 below, modification of the SYNTERGENT® APW with the PEG ester of PLA does not build a stable foam like the standard SYNTERGENT® APW. Scouring is equivalent or better than in some cases. Wetting varied with some sample modifications very similar to the standard mix. Some variations in the drop absorbency test as well. All modifications were stable in caustic in the two temperature ranges tested. Overall, the PEG 400 provided the best result on the 100% cotton knit.

TABLE 9

| | Cotton Greige | | | Drop | Waring Blender Foam Test | | Caustic Stability 25 C./60 C. | Extractions | |
| --- | --- | --- | --- | --- | --- | --- | --- | --- | --- |
| | Disk Wetting Tests Sink Time in Seconds @25 C. | | | Absorbancy (Applied fabric) 30 sec max | Initial Foam Height | After 30 Seconds | Maximum Stability of NaOH 100% | Water Greige (10.05) | Solvent Greige (0.60) |
| Product/Product Usage | 1 g/l | 2 g/l | 4 g/l | 1 g/l | 1 g/l | | 5 g/l | 0.17 | 0.21 |
| SYNTERGENT ® APW Std | <30 | 19 | 9 | 2 | 70 ml | 70 ml | Stable | 0.17 | 0.21 |
| SYNTERGENT ® APW Mod w/PLA-PEG 200 crystalline | <30 | 20 | 10 | 4 | 70 ml | 60 ml | Stable | 0.12 | 0.20 |
| SYNTERGENT ® APW Mod w/PLA-PEG 400 crystalline | <30 | 20 | 11 | 1 | 60 ml | 50 ml | Stable | 0.10 | 0.18 |
| SYNTERGENT ® APW Mod w/PLA-PEG 600 crystalline | <30 | 20 | 13 | 1 | 60 ml | 50. ml | Stable | 0.48 | 0.18 |
| SYNTERGENT ® APW Mod w/PLA Decaglycerol | <30 | 20 | 10 | 2 | 72 ml | 62 ml | Stable | 0.30 | 0.20 |
| SYNTERGENT ® APW Mod w/PLA Zemea | <30 | 21 | 10 | Inst | 70 ml | 60 ml | Stable | 0.60 | 0.17 |
| SYNTERGENT ® APW Mod w/PLA Triglycerol | <30 | <30 | 20 | 4 | 72 ml | 62 ml | Stable | 0.53 | 0.18 |
| SYNTERGENT ® APW Mod w/PLA Pentaglycerol | 30 | 24 | 10 | 4 | 80 ml | 70 ml | Stable | 0.32 | 0.18 |
| SYNTERGENT ® APW Mod w/ PLA-PEG 1450 | <30 | 20 | 10 | 1 | 70 ml | 60 ml | Stable | 0.28 | 0.18 |
| SYNTERGENT ® APW Mod w/PLA-PEG 4000 | <30 | 22 | 11 | 2 | * | * | — | 0.30 | 0.20 |

Table 10 below show results of single strike-through test for 12 gsm polypropylene for PEG 400, PEG 1450, triglycerol, and pentaglycerol esters of PLA.

TABLE 10

|  | Color | Sample Fabric ID | 5 Blotter Paper Mass (g) | *LF = 3.3 | −5 ml | SST (s) | Rewetting (g) | % FOY |
|---|---|---|---|---|---|---|---|---|
| PLA-PEG 1450 Spray Evaluation | Purple | A | 7.2377 | 23.9 | 18.9 | 1.3 | 0.2821 | 0.57 |
|  |  | E | 7.1390 | 23.6 | 18.6 | 1.26 | 0.3205 | 0.55 |
|  |  | H | 7.3390 | 24.2 | 19.2 | 1.32 | 0.2825 | 0.48 |
|  |  | I | 7.3989 | 24.4 | 19.4 | 1.22 | 0.2554 | 0.55 |
|  |  | J | 7.4557 | 24.6 | 19.6 | 1.37 | 0.3268 | 0.45 |
| PLA Triglycerol Spray Evaluation | Black | 6 | 7.5495 | 24.9 | 19.9 | 1.49 | 0.3040 | 0.42 |
|  |  | 7 | 7.2885 | 24.1 | 19.1 | 1.25 | 0.2599 | 0.44 |
|  |  | 8 | 7.3824 | 24.4 | 19.4 | 1.48 | 0.2565 | 0.47 |
|  |  | 9 | 6.5292 | 21.5 | 16.5 | 1.49 | 0.2559 | 0.50 |
|  |  | 10 | 6.7741 | 22.4 | 17.4 | 1.33 | 0.2249 | 0.46 |
| PLA-PEG 400 Spray Evaluation | Black | 3 | 7.2122 | 23.8 | 18.8 | 1.5 | 0.2494 | 0.35 |
|  |  | 6 | 7.2620 | 24.0 | 19.0 | 1.21 | 0.2239 | 0.34 |
|  |  | 7 | 7.0435 | 23.2 | 18.2 | 1.50 | 0.2425 | 0.36 |
|  |  | 8 | 6.8915 | 22.7 | 17.7 | 1.30 | 0.2188 | 0.33 |
|  |  | 9 | 6.9723 | 23.0 | 18.0 | 1.18 | 0.2197 | 0.33 |
| PLA Pentaglycerol Spray Evaluation | Black | 3 | 6.9102 | 22.8 | 17.8 | 1.45 | 0.2445 | 0.73 |
|  |  | 7 | 6.8848 | 22.7 | 17.7 | 1.69 | 0.2846 | 0.73 |
|  |  | 8 | 6.9511 | 22.9 | 17.9 | 1.63 | 0.2462 | 0.73 |
|  |  | 9 | 7.0655 | 23.3 | 18.3 | 1.46 | 0.2348 | 0.72 |
|  |  | 10 | 6.9354 | 22.9 | 17.9 | 1.54 | 0.2548 | 0.66 |
|  |  | Average | 7.1111 | 23.47 | 18.47 | 1.40 | 0.2594 | 0.51 |
|  |  | St. Dev. | 0.259 | 0.855 | 0.855 | 0.144 | 0.032 | 0.14 |
|  |  | Var(%) | 3.643 | 3.643 | 4.629 | 0.000 | 12.214 |  |

Table 11 below show results of single strike-through test for 12 gsm polypropylene for same PEG 400, PEG 1450, triglycerol, and pentaglycerol esters of PLA performed on the same samples identified in Table 10.

TABLE 11

Web Material: PP
Spray Finish: STANTEX ® K 1342
Average % FOY: 0.52

|  | Color | Sample Fabric ID | Run 1 (s) | Run 2 (s) | Run 3 (s) | % FOY |
|---|---|---|---|---|---|---|
| PLA-PEG 1450 Spray Evaluation | Purple | A | 1.00 | 9.61 | 27.01 | 0.57 |
|  |  | E | 0.81 | 5.20 | 7.52 | 0.55 |
|  |  | H | 0.87 | 2.97 | 4.50 | 0.48 |
|  |  | I | 0.77 | 4.88 | 3.86 | 0.55 |
|  |  | J | 0.88 | 4.63 | 5.64 | 0.45 |
| PLA Triglycerol Spray Evaluation | Black | 6 | 0.82 | 4.27 | 5.97 | 0.42 |
|  |  | 7 | 0.87 | 7.15 | 10.14 | 0.44 |
|  |  | 8 | 1.01 | 3.46 | 5.75 | 0.47 |
|  |  | 9 | 1.10 | 2.91 | 3.58 | 0.50 |
|  |  | 10 | 0.93 | 27.96 | 8.46 | 0.46 |
| PLA-PEG 400 Spray Evaluation | Black | 3 | 0.87 | 2.49 | 5.37 | 0.35 |
|  |  | 6 | 0.79 | 1.63 | 2.53 | 0.34 |
|  |  | 7 | 1.01 | 1.79 | 4.95 | 0.36 |
|  |  | 8 | 1.01 | 3.22 | 5.24 | 0.33 |
|  |  | 9 | 1.03 | 4.72 | 10.72 | 0.33 |
| PLA Pentaglycerol Spray Evaluation | Black | 3 | 1.19 | 1.90 | 3.49 | 0.73 |
|  |  | 7 | 1.21 | 1.79 | 3.15 | 0.73 |
|  |  | 8 | 0.99 | 1.93 | 2.34 | 0.73 |
|  |  | 9 | 1.16 | 1.85 | 3.25 | 0.72 |
|  |  | 10 | 1.03 | 1.95 | 2.31 | 0.66 |
|  |  | Average | 0.97 | 3.26 | 5.20 | 0.51 |
|  |  | St. Dev. | 0.13 | 1.57 | 2.49 | 0.14 |
|  |  | Var(%) | 13.67 | 47.99 | 47.89 |  |

Results of Single Strike Through ("SST") and Multiple Strike Through tests are shown in Table 12 below for PEG esters of PLA having weight ratios of PEG:PLA of 44:56; 50:50; 30:70; and 56:44 on 12 gsm polypropylene nonwoven applied at 0.52 weight percent finish on yarn ("FOY"). PEG 400 and PEG 600 esters of PLA meet SST and MST requirements and are comparable to or better than a conventional finish sold by Pulcra Chemicals LLC under the STANTEX® tradename.

TABLE 12

| Weight Ratio PEG:PLA | Ester | % FOY | Run 1 | Run 2 | Run 3 | St. Dev. | SST | Rewet | St. Dev. |
|---|---|---|---|---|---|---|---|---|---|
| 44:56 | PLA-PEG 200 | 0.57 | 7.58 | 9.72 | 7.04 | 0.54 | 4.76 | 0.2267 | 0.0084 |
| | PLA-PEG 400 | 0.51 | 2.63 | 5.22 | 6.01 | 0.38 | 3.15 | 0.2769 | 0.0065 |
| | PLA-PEG 600 | 0.48 | 1.49 | 7.03 | 5.77 | 0.39 | 2.03 | 0.2046 | 0.0380 |
| | PLA-PEG 600 (aged) | 0.51 | 1.37 | 4.42 | 5.51 | 0.11 | 1.88 | 0.2485 | 0.0665 |
| | PLA-PEG 1450 | 0.48 | 2.06 | 3.97 | 7.63 | 0.53 | 1.98 | 0.2495 | 0.0577 |
| | PLA Triglycerol | 0.52 | 6.26 | 6.97 | 7.00 | 4.02 | 7.84 | 0.2189 | 0.0191 |
| | PLA Pentaglycerol | 0.55 | 37.27 | 9.09 | 11.21 | 3.07 | 14.12 | 0.2472 | 0.0597 |
| 50:50 | PLA-PEG 200 | 0.58 | 3.75 | 6.76 | 6.81 | 1.43 | 6.79 | 0.2231 | 0.0399 |
| | PLA-PEG 400 | 0.53 | 1.70 | 3.80 | 3.45 | 0.25 | 2.32 | 0.2607 | 0.0453 |
| | PLA-PEG 600 | 0.50 | 1.31 | 2.61 | 6.83 | 0.20 | 1.82 | 0.2222 | 0.0333 |
| | PLA-PEG 1450 | 0.52 | 1.91 | 7.80 | 5.66 | 0.93 | 2.41 | 0.2169 | 0.0427 |
| | PLA Triglycerol | 0.58 | 3.87 | 4.39 | 5.43 | 0.95 | 5.96 | 0.2100 | 0.0336 |
| | PLA Pentaglycerol | 0.54 | 8.99 | 10.30 | 7.00 | 2.48 | 6.94 | 0.2431 | 0.0528 |
| 30:70 | PLA-PEG 200 | 0.55 | 9.50 | 8.53 | 9.44 | 1.90 | 8.01 | 0.2395 | 0.0450 |
| | PLA-PEG 400 | 0.52 | 4.69 | 5.79 | 4.49 | 1.93 | 6.33 | 0.2964 | 0.0620 |
| | PLA-PEG 600 | 0.51 | 2.28 | 4.35 | 5.06 | 1.58 | 3.66 | 0.2029 | 0.0254 |
| | PLA-PEG 1450 | 0.49 | 2.23 | 6.16 | 5.13 | 0.85 | 2.72 | 0.2733 | 0.0281 |
| | PLA Triglycerol | 0.53 | 45.43 | 63.62 | 49.69 | 6.77 | 12.28 | 0.2121 | 0.0043 |
| | PLA Pentaglycerol | 0.47 | 12.11 | 10.13 | 8.24 | 2.52 | 8.65 | 0.2264 | 0.0503 |
| 56:44 | PLA-PEG 200 | 0.55 | 4.90 | 7.21 | 6.76 | 0.84 | 4.73 | 0.2225 | 0.0491 |
| | PLA-PEG 400 | 0.54 | 1.76 | 5.65 | 6.13 | 0.27 | 2.42 | 0.2516 | 0.0087 |
| | PLA Triglycerol | 0.50 | 7.98 | 7.89 | 7.21 | 1.41 | 5.03 | 0.1984 | 0.0111 |
| | PLA Pentaglycerol | 0.54 | 6.66 | 7.85 | 7.67 | 6.04 | 9.20 | 0.2591 | 0.0124 |
| | STANTEX® K 1342 | 0.51 | 0.97 | 3.26 | 5.20 | 0.14 | 1.40 | 0.2594 | 0.0317 |
| | Unfinished | 0.00 | 11.14 | 10.25 | 10.06 | 5.92 | 12.44 | 0.2083 | 0.0343 |

Results of static and friction testing of PEG esters of PLA (PEG 400 MW, 1450 MW and 4000 MW) on 300 denier polypropylene applied at 1% finish-on-yarn ("FOY") are shown in Tables 13a-13b below and are compared to results for unfinished yarn and results for conventional finishes sold by Pulcra under the tradename STANTEX®. The PEG esters of PLA provided comparable result to the conventional finishes.

TABLE 13a

Fiber/Metal 100 meters/min

| Finish | T1 Mean | Coefficient of friction - uf Mean | Final Static (Volts) |
|---|---|---|---|
| Unfinished | 30.5 | 0.614 | −0.1 |
| STANTEX® H 2650 Ester | 33.4 | 0.658 | 102.3 |
| STANTEX® S 6327 | 38.1 | 0.645 | 297.1 |
| STANTEX® F 2761 | 59.9 | 0.807 | −14.2 |
| STANTEX® K 1342 | 27.5 | 0.57 | 221 |
| PLA-PEG 400 | 215.7 | 0.983 | −40.1 |
| PLA-PEG 1450 | 92.3 | 0.798 | −170.1 |
| PLA-PEG 4000 | 127.9 | 0.982 | −155.7 |

TABLE 13b

Fiber/Fiber 0.5 cm/min

| Finish | T1 Mean | uf Mean | Stick-Slip |
|---|---|---|---|
| Unfinished | 106.6 | 0.066 | 33.5 |
| STANTEX® H 2650 Ester | 74.4 | 0.047 | 25.9 |
| STANTEX® S 6327 | 67.9 | 0.042 | 21.8 |
| STANTEX® F 2761 | 69.8 | 0.044 | 16.1 |
| STANTEX® K 1342 | 68.5 | 0.045 | 21.5 |
| PLA-PEG 400 | 77.5 | 0.048 | T1.1 |
| PLA-PEG 1450 | 76.1 | 0.047 | 22.4 |
| PLA-PEG 4000 | 86.3 | 0.053 | 11.5 |

In the specification and/or FIGURES, examples of embodiments have been disclosed. The present invention is not limited to such exemplary embodiments. Unless otherwise noted, specific terms have been used in a generic and descriptive sense and not for purposes of limitation. The use of the term "and/or" includes any and all combinations of one or more of the associated listed items. For the ranges (i.e. "between_____ and _____") of temperature, percentages, daltons, etc. set forth above, "between" means "inclusively between" so that the numbers provided in the ranges are included in the ranges (e.g., between 1 and 10 includes 1 and 10).

What is claimed is:

1. A textile exhibiting hydrophilicity comprising: (a) a plurality of fibers; and (b) an ester of the formula (I):

$$*{-}\left[\mathrm{O{-}CH(CH_3){-}C(=O)}\right]_m{-}\left[\mathrm{O{-}CH_2{-}CH_2}\right]_n{-}\mathrm{O{-}H} \quad (I)$$

or the formula (II):

$$\mathrm{H}{-}\left[\mathrm{O{-}CH(CH_3){-}C(=O)}\right]_{m1}{-}\left[\mathrm{O{-}CH_2{-}CH_2}\right]_n{-}\left[\mathrm{O{-}C(=O){-}CH(CH_3)}\right]_{m2}{-}\mathrm{O{-}H} \quad (II)$$

or a combination thereof, wherein m is an integer greater than 1 and less than 10, n is an integer greater than 1 and less than 90, m1 and m2 are integers greater than 1 and less than 10, wherein m1 and m2 can be equal or unequal wherein the ester of polylactic acid has a weight-average molecular weight of 4,000 daltons or less, and;

wherein the fabric is a woven or knitted fabric, the woven or knitted fabric comprising polyester and cotton and wherein the polyester and cotton comprise a blend of 65 percent polyester and 35 percent cotton.

2. The textile of claim 1, wherein the fabric is a nonwoven fabric.

3. The textile of claim 2, wherein the nonwoven fabric comprises polyester.

4. The textile of claim 2, wherein the nonwoven fabric comprises polypropylene.

5. The textile of claim 1, wherein the woven or knitted fabric comprises nylon.

6. The textile of claim 1, wherein the weight-average molecular weight of the ester (b) is between 200 daltons and 4000 daltons.

7. The textile of claim 1, wherein the weight-average molecular weight of the ester (b) is between 400 daltons and 2000 daltons.

8. The textile of claim 1, wherein the textile is made of at least one synthetic polymer selected from the group consisting of: polyester, polylactic acid, polyolefins, polyamides, acrylics, nylons, polypropylene, aramid; or manmade fibers such as: acetate, lyocell, and rayon; or natural fibers such as bamboo, cotton, flax, hemp, and wool.

9. The textile of claim 1, wherein the textile is a nonwoven textile, selected from the group consisting of spunbond, melt-blown, carded, air laid, wet laid, or combinations thereof, or a woven or knitted textile such as garments, including sports clothing.

10. The textile of claim 1, wherein the textile is one or more selected from the group consisting of: fibers, filaments, yarns, woven, nonwoven, and knitted fabrics.

11. The textile of claim 1, wherein the ester has a PEG:PLA weight ratio between 45:55 and 55:45.

12. The textile of claim 1, wherein the weight-average molecular weight of the PEG units in the esters is between 100 and 2000 daltons.

* * * * *